(12) United States Patent
Synytsya

(10) Patent No.: US 11,864,533 B2
(45) Date of Patent: Jan. 9, 2024

(54) AUTOMATICALLY REGULATED LEASH FOR DOMESTIC ANIMALS

(71) Applicant: Yuriy Yuriyovych Synytsya, Chernigiv (UA)

(72) Inventor: Yuriy Yuriyovych Synytsya, Chernigiv (UA)

( * ) Notice: Subject to any disclaimer, the term of this patent is extended or adjusted under 35 U.S.C. 154(b) by 190 days.

(21) Appl. No.: 17/594,659

(22) PCT Filed: Nov. 8, 2019

(86) PCT No.: PCT/UA2019/000139
§ 371 (c)(1),
(2) Date: Oct. 25, 2021

(87) PCT Pub. No.: WO2020/219003
PCT Pub. Date: Oct. 29, 2020

(65) Prior Publication Data
US 2022/0201981 A1    Jun. 30, 2022

(30) Foreign Application Priority Data
Apr. 25, 2019   (UA) .............................. a 2019 04468

(51) Int. Cl.
*A01K 27/00*     (2006.01)

(52) U.S. Cl.
CPC ................... *A01K 27/004* (2013.01)

(58) Field of Classification Search
CPC ........ A01K 27/004; A01K 27/003; F16F 1/10
(Continued)

(56) References Cited

U.S. PATENT DOCUMENTS

| 4,748,937 A * | 6/1988 | Musetti ................ | A01K 27/004 119/796 |
| 2008/0072844 A1* | 3/2008 | Konigsberg ......... | A01K 27/003 119/770 |

(Continued)

FOREIGN PATENT DOCUMENTS

| CN | 109105291 A * | 1/2019 | ........... A01K 27/003 |
| DE | 39 12 069 A1 | 10/1990 | |

(Continued)

OTHER PUBLICATIONS

International Search Report dated Feb. 25, 2020 in International Application No. PCT/UA2019/000139.

*Primary Examiner* — Peter M Poon
*Assistant Examiner* — Shada Mohamed Alghailani
(74) *Attorney, Agent, or Firm* — Saliwanchik, Lloyd & Eisenschenk

(57) ABSTRACT

The invention relates to extensible leashes for domestic animals comprising a means for blocking extension of a cord (6) and allows the cord (6) to be extended up to a given maximum length in a regulated fashion. The automatically regulated leash for domestic animals that consists of a rind-shaped hollow body (12, 2) with a handle, wherein a winding roll with a cord (6) is mounted, the free end of the cord (6) is outwardly withdrawn through an opening in the body (12, 2), a stop (8) mechanism for the cord (6) that is regulated by a button (7) located on the body (12, 2). According to the invention, length of the cord (6) is from 2.5 to 3.5 meters. The cord (6) is configured to be wound on the roll that is mounted on guides in the body (12, 2) and comprises, on an inner cylindrical surface, teeth that are internally engaged with a toothed drum (4) mounted on the shaft fixedly attached in a cavity of the handle that is made as an elongated protrusion that has an elliptical shape in (Continued)

cross-section and made integrally with the body (12, 2). Inside the toothed drum (4) there is mounted a spiral band spring (5) that is made of a high-carbon alloyed steel having a Mn content of not more than 1.2%, which has a free end that is fixed on the shaft, and another one that is fixed on a lateral inner wall of the drum (4) having an operational stroke range along the diameter of from 4 to 15 mm. Width of the band spring (5) is within 12±5 mm, length in a deployed state is 2500±800 mm, thickness is 0.1±0.03 mm. Therewith, the diameter of the toothed drum (4) is 0.25-0.40 of the diameter of the toothed surface of the winding roll. The cord (6) is a band that has light-reflecting elements. The body (12, 2) and the internal components of the structure are made of ABS-plastic. The body (12, 2) portion that is provided with the opening for withdrawal of the free end of the cord (6) is displaced relative to the central axis thereof, while the center of gravity is located closer to the handle. The hollow ring-shaped body (12, 2) is made from two symmetrical half pieces. The band spring (5) has a high fatigue strength limit.

5 Claims, 2 Drawing Sheets

(58) Field of Classification Search
USPC .................................................. 267/272, 279
See application file for complete search history.

(56) References Cited

U.S. PATENT DOCUMENTS

| | | | |
|---|---|---|---|
| 2011/0126778 A1* | 6/2011 | Mitchell | A01K 27/006 |
| | | | 119/796 |
| 2015/0128879 A1* | 5/2015 | Anderson | A01K 27/004 |
| | | | 119/796 |
| 2016/0128305 A1* | 5/2016 | van Overbeek | B65H 75/48 |
| | | | 119/796 |

FOREIGN PATENT DOCUMENTS

| | | | | |
|---|---|---|---|---|
| DE | 10 2009 010 442 A1 | 9/2010 | | |
| DE | 20 2012 010 459 U1 | 1/2013 | | |
| EP | 2 095 708 A2 | 9/2009 | | |
| EP | 2 498 597 B1 | 4/2014 | | |
| NL | 1005781 C2 * | 10/1998 | ........... | A01K 27/004 |
| RU | 2 620 365 C2 | 5/2017 | | |

* cited by examiner

AUTOMATICALLY REGULATED LEASH FOR DOMESTIC ANIMALS

CROSS-REFERENCE TO RELATED APPLICATIONS

This application is the U.S. national stage application of International Patent Application No. PCT/UA2019/000139, filed Nov. 8, 2019, which claims the benefit under 35 U.S.C. § 119 of Ukrainian Application No. a 2019 04468, filed Apr. 25, 2019, the disclosures of each of which are incorporated herein by reference in their entirety.

FIELD OF THE INVENTION

The invention relates to extensible leashes for domestic animals comprising a means for blocking extension of a cord and allows the cord to be extended up to a given maximum length in a regulated fashion.

PRIOR ART

"A leash for dogs or other domestic animals" is known. The leash comprises a handle and a box-shaped body that houses a cord-winding pulley. The handle is provided with a button that causes stop and release of the pulley by means of an appropriate pivot mechanism. The handle has open annular profile with rotational pins at free ends. A rectangular short, pipe having holes for coupling the handle pins is connected to said box-shaped body. (Patent EP2498597 (B1) as of Apr. 9, 2014).

"A leash for domestic animals having a function of adjusting a cord provided with a protective overlay" is also known. A winding device and a brake mechanism are located inside a body of the leash. The body of the leash is provided with an opening to pull the cord. The brake mechanism is controlled by a button. The leash contains a knob to be held in one hand and a protective overlay to protect the body against impacts. The protective overlay consists of a single hollow element, which is installed at the front face of the body according to outputs for the cord. (Patent of the Russian Federation No. 2620365 as of May 25, 2017 Bul. No. 15).

The one being closest to the claimed technical solution is "A cord coiling device with a tape measure, the device comprising a drum rim and a spring-type braking mechanism having an opening for a handle" that consists of a ring-shaped hollow body with a handle, the body houses a coiling roll with a cord, which free end is outwardly withdrawn through an opening in the body, a stop mechanism for the cord that is regulated by a button located on the body. (Patent DE3912069 (A1) as of Oct. 11, 1990).

The known technical solutions suffer from a series of significant drawbacks.

In the known analogues, the mechanism is driven by a spring that is located in the drum that is fixed on a shaft in a solid body with a handle. The cord of the leash is coiled onto the drum. Rotation of the drum with unwound cord of a desired length is stopped by a braking stopper. Such structure has large overall dimensions caused by a fact that the operation mechanism in the solid body is spaced from the handle. Furthermore, a gravity center of such structure is displaced towards the operation mechanism area. In turn, it increases an additional load onto a human wrist. The spring mechanism in the known analogues is not suitable for high loads, and the cord does not have elements that could protect from probable accidents associated with usage of the leash in insufficient light conditions (at twilight, at night etc.). The drawback of the structure that is the closest to the claimed technical solutions lies in limitation of the length of the cord winding up to 2 meters due to impossibility of installing the drum with a spring having sufficient parameters into the ring-shaped body.

SUMMARY OF THE INVENTION

A task has been set to improve the structure by including new functional elements and improving the known technical solutions due to introduction of a cord winding roll into the structure, the roll having an inner cylindrical surface comprising teeth and a toothed drum that is fixedly mounted on a shaft and fixed in a cavity of the body handle, as well as development of a spring having a high fatigue strength limit with minimum dimensions, the spring being capable of winding the cord having a length of at least from 2.5 to 3.5 meters, reducing the overall dimensions, increasing the operational safety of the leash.

The set task is solved as follows.

The automatically regulated leash for domestic animals that consists of a rind-shaped hollow body with a handle, wherein a winding roll with a cord is mounted, the free end of the cord is outwardly withdrawn through an opening in the body, a stop mechanism for the cord that is regulated by a button located on the body. According to the invention, length of the cord is from 2.5 to 3.5 meters. The cord is configured to be wound on the roll that is mounted on guides in the body and comprises, on an inner cylindrical surface, teeth that are internally engaged with a toothed drum mounted on the shaft fixedly attached in a cavity of the handle that is made as an elongated protrusion that has an elliptical shape in cross-section and made integrally with the body. Inside the toothed drum there is mounted a spiral band spring that is made of a high-carbon alloyed steel having a Mn content of not more than 1.2%, which has a free end that is fixed on the shaft, and another one that is fixed on a lateral inner wall of the drum having an operational stroke range along the diameter of from 4 to 15 mm. Width of the band spring is within 12±5 mm, length in a deployed state is 2500±800 mm, thickness is 0.1±0.03 mm. Therewith, the diameter of the toothed drum is 0.25-0.40 of the diameter of the toothed surface of the winding roll. The cord is a band that has light-reflecting elements. The body and the internal components of the structure are made of ABS-plastic. The body portion that is provided with the opening for withdrawal of the free end of the cord is displaced relative to the central axis thereof, while the center of gravity is located closer to the handle. The hollow ring-shaped body is made from two symmetrical half pieces. The band spring has a high fatigue strength limit.

Technical Effect

The roll for winding the leash cord is located in the leash body. In turn, the teeth of the inner cylindrical surface are engaged with the toothed drum, wherein the spiral band spring is located. In the process of designing, in order to locate the toothed drum within the dimensions of the leash roll, a series of calculations with various spring parameters has been conducted. The spring is made of the high-carbon steel having a manganese content of up to 1.2% that significantly eliminates harmful effect of sulfur and phosphorus onto properties of the steel, increases its hardness, tightens it, increases the elasticity limit and rupture resistance, which is important for the spring steel. Therewith, the manganese content shall not exceed 1.2%, since exceeding this limit causes the steel to be tend to tempering embrittlement. The spring is characterized by a high fatigue strength limit that allows to withstand long-term alternating loads caused by elongation and shortening of the leash length in the usage process. The operating parameters of the spring, namely: the spring operational stroke range, width, length in the deployed state and thickness of the steel band, from which the spring is made, have been found experimentally. When the width of the steel band is less than 12 mm, a probability of breakage of the spring is increased that is associated with alternating impulsive loads. In turn, increase of the width of the steel band up to more than 12 mm will lead to a need in increasing the size (thickness) of the roll body. The length of the steel band in the spring is a design parameter and depends on the spring thickness. Moving beyond the permitted values upwardly will lead to increase of the roll dimensions, if downwardly—it will lead to impossibility to find the spring with the required parameters. When the steel band, from which the spring is made, has a thickness of less than 0.06 mm, a probability of its breakage is reduced. Furthermore, when the steel band in the spring has a thickness of less than 0.06 mm, its elastic force is reduced, which may not avoid a full winding of the leash onto the toothed wheel. When the steel band has a thickness of more than 0.12 mm, overall dimensions of the toothed drum of the spring, thus, the overall dimensions of the body as well, shall be significantly increased.

A set of the spring parameters, which are found experimentally, allows to wind and unwind the leash cord, which has a length of from 2.5 to 3.5 meters, with the mentioned forces. It provides a significant increase of a service life of the structure, safe and reliable usage thereof. The length of the leash from 2.5 to 3.5 meters, which is found experimentally as well, is the most optimal. Reduction of the leash length will lead to limitation of animal's freedom, while increase of its length will lead to necessity to increase the body size and the structure weight. Also, the leash cord has light-reflecting elements that provides for a safe usage of the leash at twilight and at night time. While making the leash body and elements from the ABS-plastic guarantees an additional rigidity and durability of the structure. Furthermore, the claimed structure reduces the load onto the human wrist due to reduction of the overall dimensions and weight that is caused by a reduced relative density of the material of the leash body, its ring shape, as well as by the fact that the opening for withdrawal of the free end of the cord is displaced relative to the central axis closer to the handle made in the form of the elongated protrusion that has elliptical shape in cross-section.

BRIEF DESCRIPTION OF THE DRAWINGS

The invention disclosed herein will be more clearly understood from the following exemplary embodiment and the corresponding accompanying drawings in which:

FIG. 1A—side view, FIG. 1B—a profile view.

Figure 1A:
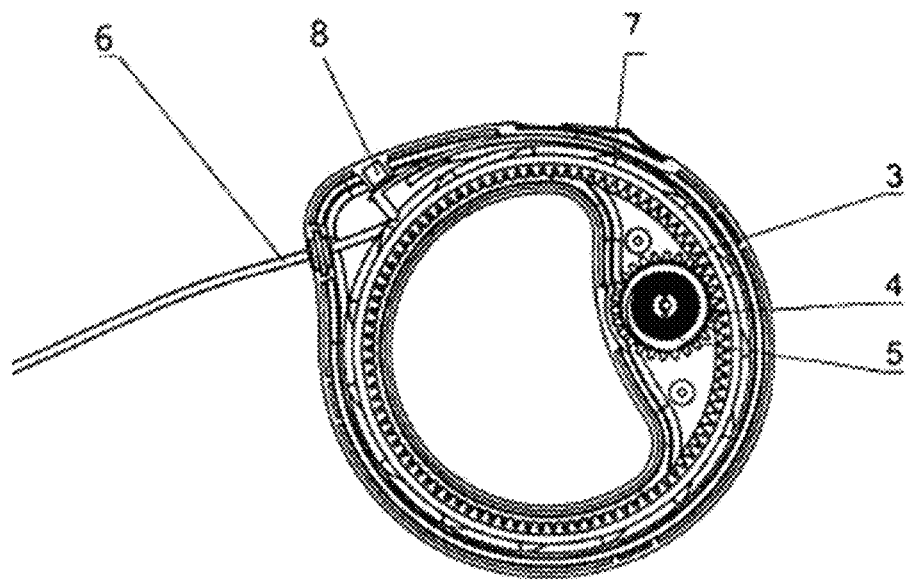
FIGS. 1A and 1B—general views of the automatically regulated leash for domestic animals.
Figure 1B:
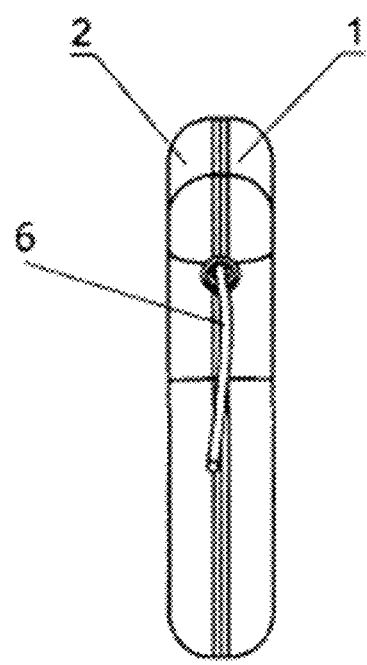
Figure 2:
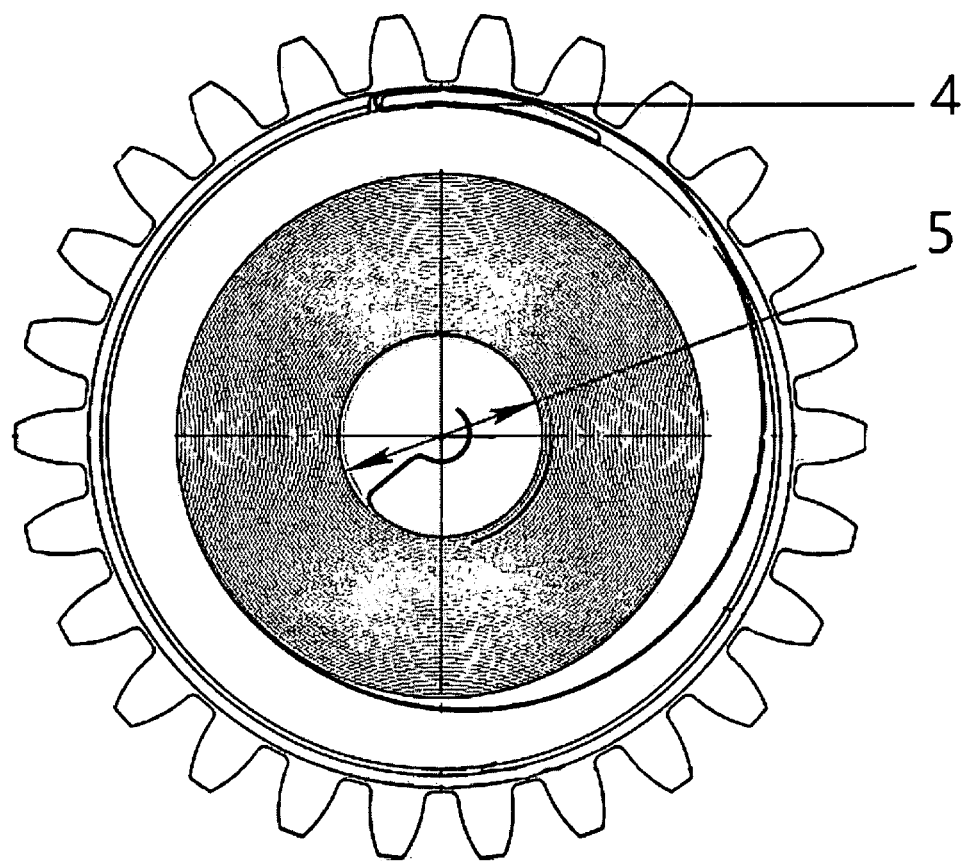
FIG. 2—the toothed drum with the spiral band spring.

Figure drawings that illustrate the invention claimed as well as particular embodiments are merely exemplary in nature and are in no way intended to limit the claims appended hereto but to explain the essence of the invention.

DETAILED DESCRIPTION OF THE INVENTION (INFORMATION CONFIRMING THE POSSIBILITY OF EMBODIMENT)

The automatically regulated leash for domestic animals has a ring-shaped hollow body that consists of two half pieces 1, 2, a toothed roll 3 located on guides of the bodies 1, 2 and a toothed drum 4. Inside the toothed drum 4 there is located a spiral band spring 5, one free end thereof is fixed on a shaft of the body 2, and another one is fixed on a lateral inner wall of the drum 4. A cord 6 having a length of from 2.5 to 3.5 meters is wound on the toothed roll 3. Also, the leash has a button 7 and stop 8 to stop the toothed roll 3.

The automatically regulated leash for domestic animals operates as follows.

In the process of usage of the leash, the spring 5 that is located inside the body of the toothed drum 4 is exposed to alternating loads caused by its extension and contraction. Long-term continuous operation is enabled by a high elastic modulus of the band steel ($E \leq 2.15 \cdot 10^5$ MPa), from which it is made. Due to the tensile force of the spring, the toothed drum 4 that engages the toothed roll 3 with the cord 6 wound thereon transmits the torque to the toothed roll 3, thus, the leash cord 6 extends. When the spring 5 is compressed, the leash cord is unwound. Regulation of the leash cord 6 length and its fixation are performed by a button 7 located on the body 1, 2. Change in the cord 6 length is provided by pressing and holding the button 7 in a given position. Also, the structure of the leash implies a fixed position of the button 7 that does not require permanent pressing and holding the button 7.

The invention claimed is:

1. An automatically regulated leash for domestic animals that comprises:
    a ring-shaped hollow body with a handle,
    a winding roll containing a cord mounted on guides on the hollow body,
    a free end of the cord outwardly withdrawn through an opening in the hollow body;
    a stop mechanism for the cord regulated by a button located on the hollow body;
    wherein the cord has a length of 2.5 to 3.5 meters, and is configured to be wound on the winding roll mounted on guides in the body,
    wherein the winding roll comprises, on an inner cylindrical surface, teeth that are internally engaged with a toothed drum mounted on a shaft fixedly attached in a cavity of the handle and made as an elongated protrusion with an elliptical shape in cross-section and is made integral with the body,
    wherein inside the toothed drum a spiral band spring is mounted made of a high-carbon alloyed steel having a Mn content of not more than 1.2%, which has a free end fixed on the shaft
    and another end fixed on a lateral inner wall of the toothed drum,
    and having an operational stroke range along a diameter thereof from 4 to 15 mm,
    a width of the spiral band spring within 12±5 mm,
    a length of the spiral band spring in a deployed state within 2500±800 mm,
    a thickness of the spiral band spring within 0.1±0.03 mm,
    and wherein a diameter of the toothed drum is 0.25-0.40 a diameter of the teeth of the winding roll.

2. The automatically regulated leash for domestic animals according to claim 1, wherein the cord comprises a band with light-reflecting elements.

3. The automatically regulated leash for domestic animals according to claim 1, wherein the ring-shaped hollow body is made of ABS-plastic.

4. The automatically regulated leash for domestic animals according to claim 1, wherein the ring-shaped hollow body provided with the opening for withdrawal of the free end of the cord is displaced relative to a central axis thereof, while a center of gravity is located closer to the handle.

5. The automatically regulated leash for domestic animals according to claim 1, wherein the ring-shaped hollow body is made from two symmetrical half pieces.

\* \* \* \* \*